United States Patent
Suzuki

(10) Patent No.: US 7,657,544 B2
(45) Date of Patent: Feb. 2, 2010

(54) STORAGE MEDIUM STORING PROGRAM, METHOD AND APPARATUS PRESENTING GUIDE CAPTIONS FOR CATEGORIZING FILES

(75) Inventor: Akira Suzuki, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 363 days.

(21) Appl. No.: 11/077,082

(22) Filed: Mar. 11, 2005

(65) Prior Publication Data
US 2006/0010128 A1    Jan. 12, 2006

(30) Foreign Application Priority Data
Jul. 9, 2004   (JP) ............................... 2004-203981

(51) Int. Cl.
*G06F 17/30* (2006.01)
(52) U.S. Cl. .................... 707/100; 707/102; 707/104.1; 715/711; 715/745; 715/775
(58) Field of Classification Search .................... None
See application file for complete search history.

(56) References Cited

U.S. PATENT DOCUMENTS

| | | | |
|---|---|---|---|
| 5,829,023 A * | 10/1998 | Bishop ........................ 711/118 |
| 5,892,917 A * | 4/1999 | Myerson ...................... 709/224 |
| 6,393,429 B1 * | 5/2002 | Yagi et al. ................... 707/102 |
| 6,477,528 B1 * | 11/2002 | Takayama ...................... 707/5 |
| 6,948,135 B1 * | 9/2005 | Ruthfield et al. ............ 715/854 |
| 7,228,299 B1 * | 6/2007 | Harmer et al. .................. 707/3 |
| 7,236,977 B1 * | 6/2007 | Seiler et al. ................. 707/100 |
| 7,284,204 B2 * | 10/2007 | Lee ............................. 715/764 |
| 7,386,552 B2 * | 6/2008 | Kitamura et al. ............. 707/10 |
| 2003/0179236 A1 * | 9/2003 | Good et al. ................. 345/764 |
| 2003/0188263 A1 * | 10/2003 | Bates et al. ................. 715/513 |
| 2004/0128277 A1 * | 7/2004 | Mander et al. ................. 707/1 |
| 2005/0125456 A1 * | 6/2005 | Hara et al. .................. 707/200 |

FOREIGN PATENT DOCUMENTS

JP    A 64-7122    1/1989

* cited by examiner

*Primary Examiner*—Tim T. Vo
*Assistant Examiner*—Michelle Owyang
(74) *Attorney, Agent, or Firm*—Oliff & Berridge, PLC

(57) ABSTRACT

An apparatus for presenting information of document files, the document files being stored on a document database where the document files are categorized and stored into any of predefined category bins, the apparatus includes: a selecting section that selects at least some of document files stored on the document database and categorized in object category bins as representative document files for each of the object category bins, the object category bins being at least part of the category bins; and a presenting section that presents information relating to the selected representative document files to a user.

16 Claims, 2 Drawing Sheets

STORAGE MEDIUM STORING PROGRAM, METHOD AND APPARATUS PRESENTING GUIDE CAPTIONS FOR CATEGORIZING FILES

BACKGROUND OF THE INVENTION

1. Field of the Invention

The present invention relates to an apparatus presenting guide captions for categorizing files into a directory or the like.

2. Description of the Related Art

For most recent databases of documents, a general practice of categorizing and managing document files using an organization of directories has been applied. For instance, in the case of a corporate managerial document database, directories labeled "general affairs," "sales," "personnel affairs," etc. are created for document categories and document files are categorized and stored into the directories. The organization of the directories is generally hierarchical. That is, under a top-level directory of "general affairs," subdirectories labeled "accounting," "messages," etc. for subcategories of documents are often created.

For conventional document databases mentioned above, however, a database manager or the like generally predefines document category bins. In some situations, when adding a new document file to a database, a user has encountered difficulty in selecting a suitable directory for storing the file. For instance, when a user who does not have complete understanding of the category bins attempts to find a directory for storing a message document file, the user may be puzzled if he or she first looks in a "personnel affairs" directory to look for a suitable category bin.

SUMMARY OF THE INVENTION

The present invention has been made in view of the above actual situation and provides an apparatus presenting guide captions for categorizing files that can enhance usability.

According to an aspect of the present invention, a storage medium readable by a computer, the storage medium storing a program for causing a computer connected to a document database where document files are categorized and stored into any of predefined category bins to perform a process includes: selecting at least some of document files stored on the document database and categorized in object category bins as representative document files for each of the object category bins, the object category bins being at least part of the category bins; and presenting information relating to the selected representative document files to a user.

According to another aspect of the present invention, a method for presenting information of document files, the document files being stored on a document database where the document files are categorized and stored into any of predefined category bins, the method includes: selecting at least some of document files stored on the document database and categorized in object category bins as representative document files for each of the object category bins, the object category bins being at least part of the category bins; and presenting information relating to the selected representative document files to a user.

Further, according to another aspect of the present invention, an apparatus for presenting information of document files, the document files being stored on a document database where the document files are categorized and stored into any of predefined category bins, the apparatus includes: a selecting section that selects at least some of document files stored on the document database and categorized in object category bins as representative document files for each of the object category bins, the object category bins being at least part of the category bins; and a presenting section that presents information relating to the selected representative document files to a user.

BRIEF DESCRIPTION OF THE DRAWINGS

Embodiments of the present invention will be described in detail based on the following figures, wherein.

DETAILED DESCRIPTION OF THE INVENTION

Figure 1:
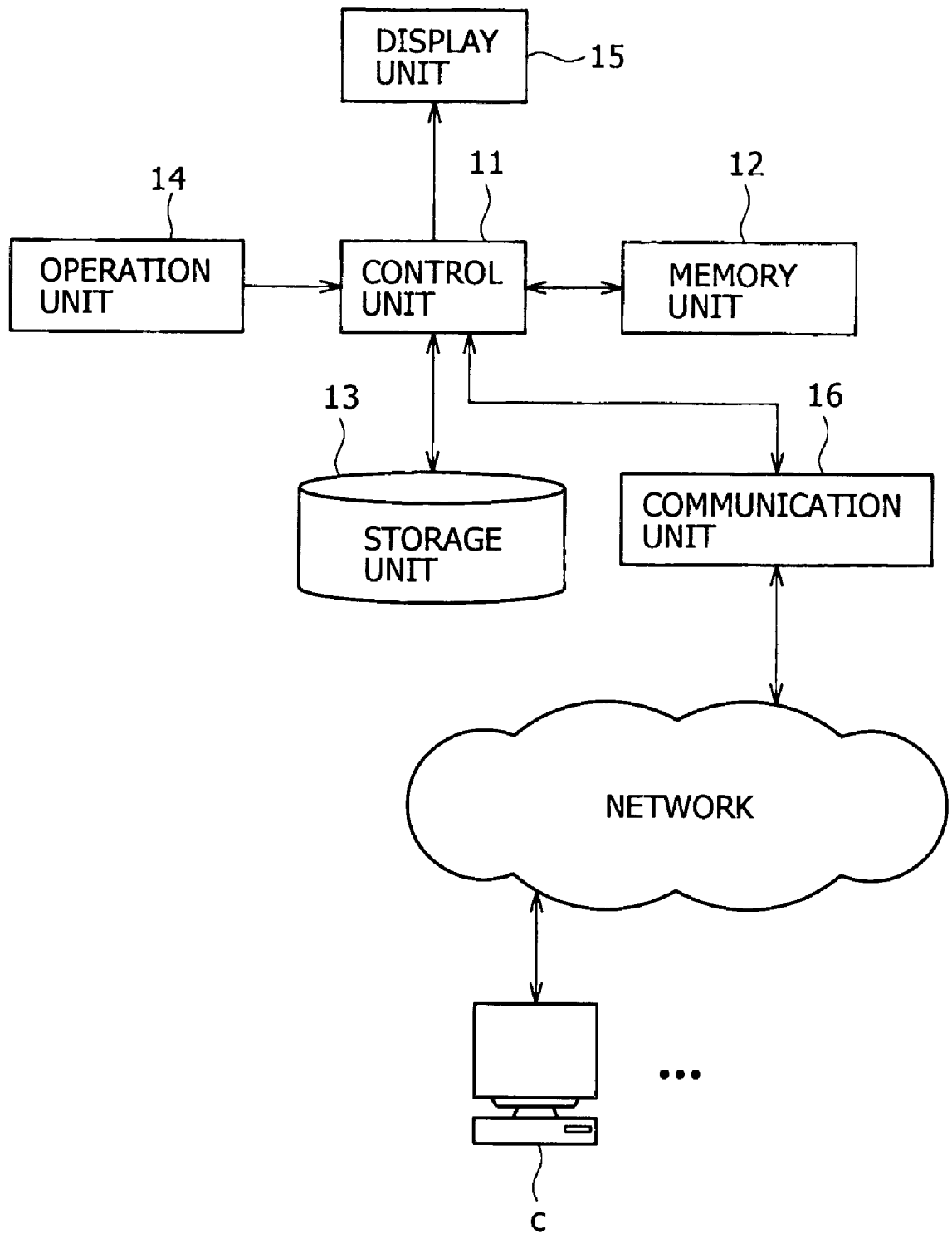
FIG. 1 is a block diagram showing an example of an apparatus presenting guide captions for categorizing files according to an embodiment of the present invention.

The present invention is now fully described by way of its illustrative embodiment with reference to the accompanying drawings. An apparatus presenting guide captions for categorizing files according to an embodiment of the present invention is configured, including a control unit 11, memory unit 12, storage unit 13, operating unit 14, display unit 15, and communication unit 16, as shown in FIG. 1. The apparatus is connected to a client device C via a network.

The control unit 11 can be implemented with a CPU or the like and operates under the control of a program stored in the memory unit 12. Processing tasks that are performed by the control unit 11 will be described in detail later. The memory unit 12 can be implemented with memory devices such as a Random Access Memory (RAM) or Read Only Memory (ROM) and a hard disk. On the memory unit 12, the program that is executed by the control unit 11 is retained. The memory unit 12 also operates as a working memory that retains various kinds of data which is used during processing performed by the control unit 11.

The storage unit 13 retains data in document files. This storage unit 13 corresponds to the document database of this invention. In this embodiment, the storage unit 13 stores document files categorized with a hierarchical organization of directories. When the control unit 11 stores a new document file into the storage unit 13 in response to a command or the like from a user, it links the document file to any directory (category bin) (that is, categorizes the file into the directory) included in the hierarchical organization of predefined directories and places the document file in that directory.

The operating unit 14 can be implemented with a mouse, keyboard, etc. The operating unit 14 is operated by the user for request entry and passes the request to the control unit 11. The display unit 15 is a display or the like and displays information in accordance with instructions from the control unit 11. The communication unit 16 is connected to the network and transmits data via the network in accordance with instructions from the control unit 11. The communication unit 16 receives data incoming via the network and passes the data to the control unit 11.

Figure 2:
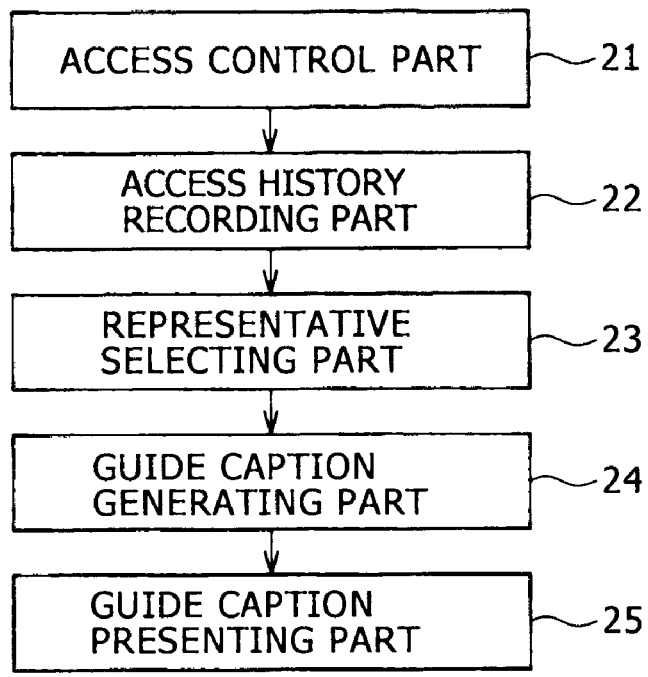
FIG. 2 shows program functional blocks for examples of processing tasks that are executed on the apparatus presenting guide captions for categorizing files according to the embodiment.

The processing tasks that are performed by the control unit are now described. The program that is executed by the control unit 11 is built, including the following functional parts: an access control part 21, an access history recording part 22, a representative selecting part 23, a guide caption generating part 24, and a guide caption presenting part 25, as shown in FIG. 2.

The access control part 21 receives an access request from a client device C and authenticates the user of the client device C. When receiving a request command for a document file from the authenticated user, the access control part 21 sends the requested document file to the client device C of the user. That is, the control unit 11 operates as a file server (document server) by executing the processing task of the access control part 21.

When the access control part 21 sends a document file to a user, the access history recording part 22 stores a set of the date and time of the sending (obtains the date and time information from a clock or the like, not shown), information identifying the destination user (which may be, e.g., the user name or mail address entered for authentication), and information identifying the document sent, as an access history, into the storage unit 13.

The representative selecting part 23 selects at least one representative document file of document files categorized in a directory for each directory in the document database. Specifically, the representative selecting part 23 selects a representative document file, based on the access history stored in the storage unit 13. Details on the processing task of the representative selecting part 23 will be described later.

The guide caption generating part 24 generates a guide caption implying the contents of a document file categorized in a directory with regard to the representative document file selected for each directory. Specifically, the guide caption mentioned herein may describe the representative document file name and key words extracted from the file (such as key words obtained by a widely known document summarizing process). If one of two representative document files is generated by updating the contents of the other representative file (that is, one file is an update version of the other file), one of them (e.g., the old one) may be deselected from the representative files.

The guide caption presenting part 25 displays the generated guide caption in place on the screen of the display unit 15. If one of two representative document files is generated by updating the contents of the other representative file (that is, one file is an update version of the other file), the update and old files may be explicitly shown. For example, the file names are displayed with the old one indented so that the viewer can discriminate the update document from the old one.

As stated above, in this embodiment, based on the contents of document files already stored in each directory, guide captions indicating what kind of document files should be categorized in each directory can be generated and presented. Thereby, the user can use the guide captions for reference when selecting a directory into which to categorize a new document file and usability can be enhanced.

The details on the processing task of the representative selecting part 23 are now described. The representative selecting part 23 targets at least part of the directories (category bins) existing in the document database as target category bins. For each target category bin, the representative selecting part 23 selects at least some of document files categorized in the target category bin as representative document files, based on the access histories of the document files.

In particular, the representative selecting part 23 obtains current date and time (real time of the on-going process) information and compares the current date and time against the date and time included in the access history of a file, thus calculating the following:

(1) difference between the time included in the access history and the current time;
(2) comparing the day of the week for the date included in the access history with the current day of the week;
(3) difference in days between the date included in the access history and the current date; and
(4) difference in months between the date included in the access history and the current date.

The representative selecting part 23 adds a first weight value which will be greater as (1) the difference between the time included in the access history and the current time is smaller, a second weight value which will be greater as (2) the day of the week for the date included in the access history is nearer to the current day of the week, a third weight value which will be greater as (3) the difference in days between the date included in the access history and the current date is smaller, and a fourth weight value which will be greater as (4) the difference in months between the date included in the access history and the current date is smaller, thus calculating weight values for the access histories of all files in a directory.

Then, the representative selecting part 23 selects access histories whose weight value exceeds a predetermined threshold or a predetermined number of access histories in descending order of the weight value and selects the document files identified by information included in the selected access histories as representative files.

As a representative document file, the representative selecting part 23 may select a document file that has not been sent to the user (authenticated user) to whom guide captions should now be presented, but has been sent to other users more than a predetermined number of times (e.g., the number of times determined in relation to the number of all users (representing, e.g., 80 percent or more of all users)), referring to the access histories.

Also, the representative selecting part 23 may select representative document files as follows. Referring to the access histories, the representative selecting part 23 gives different points to different classes of access histories, wherein the different classes are access histories pertaining to the user (authenticated user) to whom guide captions should now be presented, access histories pertaining to predefined users (who belong to the user group which authenticated user belongs to, e.g., if users are grouped beforehand), and access histories pertaining to other users. For each document file, the representative selecting part 23 sums up the points given to the access histories relevant to the document file, calculates the points per document file, and select document files whose points exceed a predetermined threshold or a predetermined number of document files in descending order of the points as representative files.

Furthermore, the representative selecting part 23 may select representative document files as follows. Referring to the access histories, the representative selecting part 23 calculates, for each document file, the number of times the file has been accessed (the number of time the file data has been sent) and selects document files for which the number of times the file data has been sent exceeds a threshold or a predetermined number of document files in descending order of the number of times the file data has been sent as representative files. Here, instead of the number of times the file has been accessed, in terms of frequency at which the file has been accessed for a certain time period (the number of times the file has been accessed for a recent period) or change of the number of times the file has been accessed over time (e.g., a document file for which the number of times the file has been accessed a day tends to increase) representative document files may be selected.

Furthermore, the representative selecting part 23 may select representative document files, based on similarity to a document file to be categorized. The similarity can be calculated by using a widely known method of calculating similarity of documents.

Also, the representative selecting part 23 may select a predetermined number of document files in order from the longest file name as representative files.

From among the representative document files selected by one of or combination of the above conditions, the representative selecting part 23 deselects a document file or files, set inaccessible to the user to whom guide captions should now be presented. In particular, in an instance where access rights are conditional, depending on user request action, for a user request issued before guide captions are presented to the user, if the user request is, e.g., "open a document file," the representative selecting part 23 deselects a document file or files for which the user is not granted the read right.

Although instances where the number of representative document files are limited in relation to the number of all users has been discussed hereinbefore, the number of representative document files maybe limited, based on the size of a guide caption to be presented (the sum of all characters in the caption). As for the weight values or points calculated for each document file, these weight values or points may be plotted in a numerical line. Distances between adjacent values on this line are calculated and a great distance having a significant difference is found, based on a statistical check. A separation point is set where the significant gap appears by the distance thus found. Document files whose value is higher than the separation point may be selected as representative files.

Figure 3:
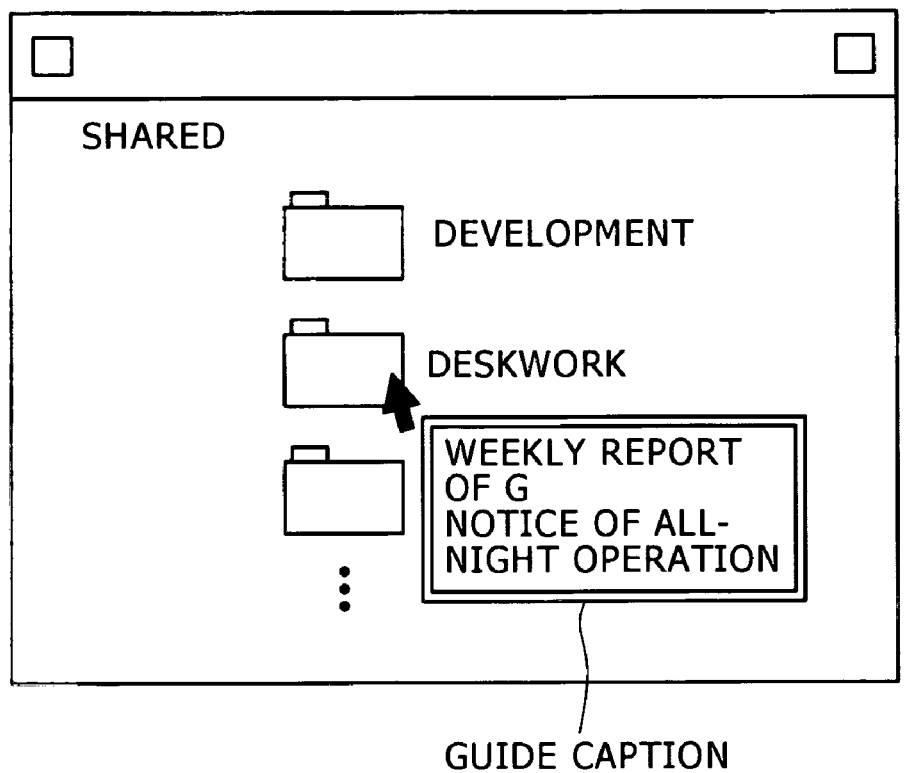
FIG. 3 illustrates an example of representing a guide caption.

According to this embodiment, when the user who is looking for a directory into which to categorize a file moves the mouse pointer across a list of directories displayed, for a directory at which the mouse pointer is positioned, its guide caption is generated and presented through the above process (FIG. 3). FIG. 3 shows an example of presenting the guide option in a popup window around the mouse pointer.

Thereby, the user can determine a directory into which to categorize a document file by reference to the guide caption and usability can be enhanced.

While an illustrative manner of selecting representatives of documents existing in a directory and presenting the guide captions pertaining to the representatives has been described hereinbefore, the selected representatives are not limited to document files and may be directories. That is, for subdirectories belonging to a target category bin, past access histories are recorded (regarding, for each subdirectory, reference to a file in the subdirectory or a directory list, receiving a document file in the subdirectory, adding a document file to the subdirectory, etc.). Different points for different request actions are defined and the points are summed per subdirectory by reference to the access histories. According to the points of the subdirectories, representative subdirectories (representative category bins) can be determined.

The control unit 11 generates guide captions (subdirectory names, etc.) pertaining to the thus determined representative category bins and presents the guide captions to the user.

When guide captions are presented, the order in which the guide captions are presented maybe changed, according the weight values or points, if applied, calculated for the document files or subdirectories, based on which the captions have been generated; the captions of the files or subdirectories may be presented in descending order of these values. These guide captions may be displayed such that their appearances change with the above values. For instance, the captions of the files or subdirectories with the greater values may be displayed in more highlight contrast to the background or in larger fonts.

The foregoing description of the embodiment of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-203981 filed on Jul. 9, 2004 including specification, claims, drawings and abstract is incorporated herein by reference in its entirety.

What is claimed is:

1. A storage medium readable by a computer, the storage medium storing a program for causing a computer connected to a document database where document files are categorized and stored into any of predefined category bins to perform a process comprising:

selecting at least some of document files stored on the document database and categorized in object category bins as representative document files for each of the object category bins, the document files being selected as representative document files based on similarity to a document file to be categorized, the object category bins being at least part of the category bins, the representative document files comprising a proper subset of the document files categorized in each respective object category bin associated with the representative document files; and presenting information extracted from the selected representative document files to a user when the user queries contents of an object category bin of the object category bins without entering the object category bin, wherein a guide caption is presented describing keywords extracted from a file and obtained by a document summarizing process, and a highlight contrast to a background for guide captions of files having greater weights regarding access histories is increased.

2. The storage medium according to claim 1, wherein the representative document files for each of the object category bins are selected based on access histories of the document files categorized in the object category bins.

3. A storage medium readable by a computer, the storage medium storing a program for causing a computer connected to a document database where document files are categorized and stored into any of predefined category bins which are organized hierarchically to perform a process comprising:

selecting at least some of subordinate category bins defined belonging to object category bins as representative subcategory bins for each of the object category bins, the subordinate category bins being selected as representative subcategory bins based on similarity between document files in the subordinate category bins and a document file to be categorized, the object category bins being at least part of the category bins, the representative subcategory bins comprising a proper subset of subcategory bins categorized in each respective object category bin associated with the representative subcategory bins; and presenting information extracted from the selected representative subcategory bins to a user when the user queries contents of an object category bin of the object category bins without entering the object category bin, wherein a guide caption is presented describing keywords extracted from a file and obtained by a document summarizing process, and a highlight contrast to a background for guide captions of subdirectories having greater weights regarding access histories is increased.

4. A method for presenting information of document files, the document files being stored on a document database where the document files are categorized and stored into any of predefined category bins, the method comprising:

selecting at least some of document files stored on the document database and categorized in object category bins as representative document files for each of the object category bins, the document files being selected as representative document files based on similarity to a document file to be categorized, the object category bins being at least part of the category bins, the representative document files comprising a proper subset of the document files categorized in each respective object category bin associated with the representative document files;

presenting information extracted from the selected representative document files to a user when the user queries contents of an object category bin of the object category bins without entering the object category bin;

presenting a guide caption describing keywords extracted from a file and obtained by a document summarizing process; and increasing a highlight contrast to a background for guide captions of files having greater weights regarding access histories.

5. The method for presenting information of a document file according to claim 4, wherein the representative document files for each of the object category bins are selected based on access histories of the document files categorized in the object category bins.

6. An apparatus for presenting information of document files, the document files being stored on a document database where the document files are categorized and stored into any of predefined category bins, the apparatus comprising:

a selecting section that selects at least some of document files stored on the document database and categorized in object category bins as representative document files for each of the object category bins, the object category bins being at least part of the category bins, the representative document files comprising a proper subset of the document files categorized in each respective object category bin associated with the representative document files; and a presenting section that presents information extracted from the selected representative document files to a user when the user queries contents of an object category bin of the object category bins without entering the object category bin, wherein the presenting section presents a guide caption describing keywords extracted from a file and obtained by a document summarizing process, and the presenting section increases a highlight contrast to a background for guide captions of files having greater weights regarding access histories.

7. The apparatus for presenting information of document files according to claim 6, wherein the representative document files for each of the object category bins are selected based on access histories of the document files categorized in the object category bins.

8. An apparatus for presenting information of category bins, connected to a document database where document files are categorized and stored into any of predefined category bins which are organized hierarchically, the apparatus comprising:

a selecting section that selects at least some of subordinate category bins defined belonging to object category bins as representative subcategory bins for each of the object category bins, the subordinate category bins being selected as representative subcategory bins based on similarity between documents in the subordinate category bins and a document file to be categorized, the object category bins being at least part of the category bins, the representative subcategory bins comprising a proper subset of subcategory bins categorized in each respective object category bin associated with the representative subcategory bins; and a presenting section that presents information extracted from the selected representative subcategory bins to a user when the user queries contents of an object category bin of the object category bins without entering the object category bin, wherein the presenting section presents a guide caption describing keywords extracted from a file and obtained by a document summarizing process, and the presenting section increases a highlight contrast to a background for guide captions of subdirectories having greater weights regarding access histories.

9. The apparatus for presenting information of document files according to claim 6, wherein the selecting section selects access histories having weight values that exceed a predetermined threshold and selects document files identified by information included in the selected access histories as representative document files.

10. The apparatus for presenting information of document files according to claim 6, wherein the selecting section selects a predetermined number of access histories having respective weight values in descending order of the respective weight values and selects document files identified by information included in the selected access histories as representative document files.

11. The apparatus for presenting information of document files according to claim 6, wherein the representative document files are selected in terms of a number of times a file has been accessed for a certain time period.

12. The apparatus for presenting information of document files according to claim 6, wherein representative document files are selected based on an increasing of a number of times a document file has been accessed per day.

13. The apparatus for presenting information of document files according to claim 6, wherein the selecting section selects a predetermined number of document files in order from a longest filename as representative document files.

14. The apparatus for presenting information of document files according to claim 6, wherein a number of representative document files is limited based on a sum of all characters in a guide caption.

15. The apparatus for presenting information of document files according to claim 6, wherein:

total weight values for a plurality of document files are calculated, the total weight values are plotted in a numerical line, distances between adjacent values on the numerical line are calculated, a great distance having a significant difference is found based on a statistical check, a separation point is set where the significant difference appeared, and document files whose total weight value is higher than the separation point are selected as representative document files.

16. The apparatus for presenting information of document files according to claim 6, wherein the selecting section calculates the following four calculated values:

a difference between a time included in an access history of a file and a current time, a comparison of a day of the week of a date included in the access history and a current day of the week, a difference in days between the date included in the access history and a current date, a difference in months between the date in the access history and the current date, and the selecting section adds four weight values, corresponding to the four respective calculated values, each weight value being greater as the respective calculated value is smaller.

\* \* \* \* \*